Patented May 8, 1934

1,957,870

UNITED STATES PATENT OFFICE 1,957,870

PROCESS OF PREPARING 2-METHYL-SELENAZOLINE

Frank L. White, Rochester, N. Y., assignor to Eastman Kodak Company, Rochester, N. Y., a corporation of New York No Drawing. Original application September 21, 1931, Serial No. 564,138. Divided and this application October 6, 1932, Serial No. 636,529

4 Claims. (Cl. 260—44)

This invention relates to a method of producing 2-methylselenazoline. This application is a division of my copending application Serial No. 564,138 filed September 21, 1931, which describes and claims selenocarbocyanine dyes and processes of preparing them from quaternary salts of 2-methylselenazoline described and claimed herein.

It is an object of the present invention to provide a process for the preparation of 2-methylselenazoline. Other objects will hereinafter appear.

In its broad concept, my invention comprises the preparation of 2-methylselenazoline by reacting a bromoethylamine hydrobromide with selenoacetamide. Its more specific embodiment will be hereinafter apparent.

2-methylselenazoline has the following structural formula:

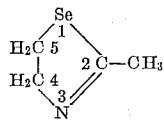

As an example of the manner of carrying out my invention, the following preparation of 2-methylselenazoline is illustrative:

10.8 g. (1 mol.) of β-bromoethylamine hydrobromide are heated in a small round-bottomed flask on a steam bath. To this hot β-bromoethylamine hydrobromide there is added in small portions, over a period of about three minutes while it is stirred with a glass rod 6.5 g. (1 mol.) of freshly prepared selenoacetamide. A melt is formed before all the selenoacetamide is added. The heating is continued for about five minutes, during which time the reaction mixture sets solid in the flask; this solid is dissolved in 200 cc. water, made alkaline by the addition of 40% sodium hydroxide and the 2-methylselenazoline thus liberated distilled from this alkaline solution by steam distillation. About 50 cc. distillate is collected. Some of the 2-methylselenazoline separates as an oil and remains as the bottom layer. This layer is separated by means of a separatory funnel. The aqueous layer is then treated with pulverized potassium hydroxide whereupon more 2-methylselenazoline separates out, which is collected by extraction with ethyl ether. This ethyl ether extract is added to the 2-methylselenazoline which has previously been removed from the distillate at the separatory funnel and the whole is then dried with solid potassium carbonate. After decanting the anhydrous ethyl ether layer (containing the 2-methylselenazoline) from the potassium carbonate, the ether is distilled off leaving 2-methylselenazoline as a residue which may be further purified by distilling under reduced pressure. The 2-methylselenazoline distills as a colorless liquid boiling at 71–72° C. at 35 mm. pressure of mercury.

What I claim as my invention and desire to secure by Letters Patent of the United States is:

1. In a process of preparing 2-methylselenazoline the step which comprises reacting β-bromoethylamine hydrobromide with selenoacetamide under the influence of heat.

2. The process of preparing 2-methylselenazoline which comprises reacting β-bromoethylamine hydrobromide with selenoacetamide under the influence of heat and then liberating 2-methylselenazoline from the reaction mass by dissolving the mass in an aqueous solution of an alkali.

3. The process of preparing 2-methylselenazoline which comprises reacting β-bromoethylamine hydrobromide with selenoacetamide under the influence of heat and then liberating the 2-methylselenazoline from the reaction mass by dissolving the mass in an aqueous solution of sodium hydroxide.

4. The process of preparing 2-methylselenazoline which comprises reacting β-bromoethylamine hydrobromide with selenoacetamide under the influence of heat and then liberating the 2-methylselenazoline from the reaction mass by dissolving the mass in an aqueous solution of an alkali and steam distilling the 2-methylselenazoline.

FRANK L. WHITE.